United States Patent
McGrew et al.

(10) Patent No.: US 8,347,073 B2
(45) Date of Patent: Jan. 1, 2013

(54) INSPECTION AND REWRITING OF CRYPTOGRAPHICALLY PROTECTED DATA FROM GROUP VPNS

(75) Inventors: David A. McGrew, Poolesville, MD (US); Mark Baugher, Portland, OR (US); Saul Adler, West Hempstead, NY (US); William C. Melohn, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1153 days.

(21) Appl. No.: 12/231,813

(22) Filed: Sep. 5, 2008

(65) Prior Publication Data

US 2010/0064137 A1    Mar. 11, 2010

(51) Int. Cl.
*H04L 29/02* (2006.01)
*H04L 9/08* (2006.01)

(52) U.S. Cl. ............. 713/153; 380/279; 726/12; 726/22

(58) Field of Classification Search .................. None
See application file for complete search history.

(56) References Cited

U.S. PATENT DOCUMENTS

| | | | | |
|---|---|---|---|---|
| 7,234,063 | B1 * | 6/2007 | Baugher et al. | 713/189 |
| 7,526,658 | B1 * | 4/2009 | He et al. | 713/193 |
| 8,155,130 | B2 * | 4/2012 | McGrew et al. | 370/401 |
| 8,160,255 | B2 * | 4/2012 | Fluhrer | 380/277 |

OTHER PUBLICATIONS

Harney et al., RFC 2093—Group Key Management Protocol (GKMP) Specification, Network Working Group, Jul. 1977.*
Cisco Systems, Inc. (B. Weiss), "Group Domain of Interpretation (GDOI) Support for RSVP", Internet-Draft, Feb. 2008, pp. 1-14, IETF Trust (2008).

* cited by examiner

*Primary Examiner* — Minh Dinh
(74) *Attorney, Agent, or Firm* — Hickman Palermo Truong Becker Bingham Wong LLP

(57) ABSTRACT

Systems, methods, and other embodiments associated with processing secure network traffic are described. One example method includes determining whether a device is a preconfigured member of a group key system. If the device is not a preconfigured member then the method selectively establishes membership in the group key system by requesting membership from a group controller. The example method may also include receiving a set of keys from the group controller and being assigned a role by the group controller. The method may further include processing secure network traffic as an inspection point, a rewriting point, and/or a validation point based on the received set of keys and the assigned role(s).

20 Claims, 6 Drawing Sheets

INSPECTION AND REWRITING OF CRYPTOGRAPHICALLY PROTECTED DATA FROM GROUP VPNS

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Network devices, including intrusion detection systems (IDS), distributed denial of service (DDoS) mitigation systems, firewalls, and network monitoring devices (e.g., Data Analyzer, sniffer), cannot perform their functions on an encrypted traffic flow. Some of these network devices may be able to perform their duties with only limited functionality. For example, a firewall cannot inspect an encrypted payload if it does not have the decryption key. Therefore, the decision to forward or drop a packet containing encrypted data is based only on the unencrypted part of the encrypted packet.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element.

In some examples, an element shown as an internal component of another element may be implemented as an external component and vice versa. Furthermore, elements may not be drawn to scale.

OVERVIEW

Described herein are example systems, methods, and other embodiments associated with processing secure network traffic. One example apparatus includes a membership logic for controlling membership in a group key system. Establishing membership in the group key system includes the membership logic requesting membership from a group controller. A positive response to the request for membership in the group key system may include receiving a set of keys and being assigned a role. The apparatus may also include a behavior logic for processing secure network traffic as an inspection point, a rewriting point, and/or a validation point based on the received set of keys and the assigned role.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

DESCRIPTION OF EXAMPLE EMBODIMENTS

Figure 1:
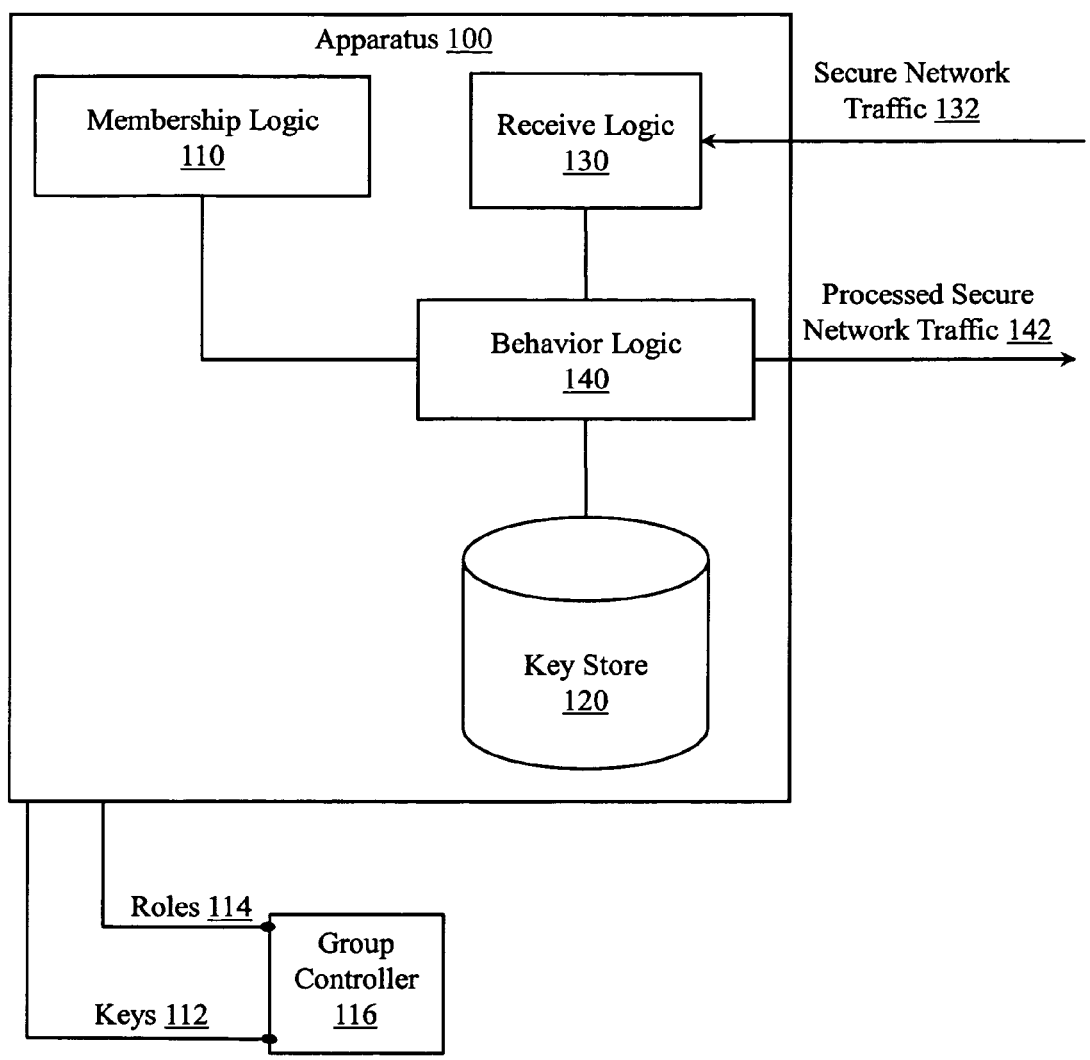
FIG. 1 illustrates an example apparatus associated with selectively. processing secure network traffic.

FIG. 1 illustrates an apparatus 100 that is associated with processing secure network traffic 132. Apparatus 100 includes a membership logic 110. Membership logic 110 controls membership in a group key system. The membership logic 110 requests membership in the group key system from the group controller 116. The membership logic 110 also requests a role(s) 114 from the group controller 116. While FIG. 1 illustrates group controller 116 providing a role 114, more generally a group controller 116 may provide a policy. The membership logic 110 makes a request for membership by sending a message to the group controller 116. The message may include a requested role(s), the identity of the requesting apparatus 100, and the identity of the secure network traffic 132 to be processed. Establishing membership in the group key system includes receiving a set of keys 112 from a group controller 116 and being assigned a role(s) 114 in response to a request for membership. "Logic", as used with respect to membership logic 110 and other logics in apparatus 100 includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., application specific integrated circuit (ASIC)), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

The group controller 116 may be a key server. The group key system may be part of a group virtual private network (VPN). The group VPN may use the internet protocol security (IPSEC) protocol. A VPN uses encryption to encapsulate network traffic between two endpoints to provide a secure connection through an otherwise insecure network, such as the Internet. The group key system may implement several different types of key management systems. Example key management systems may include the group secure association key management protocol (GSAKMP), the group domain of interpretation (GDOI) protocol, and so on. A person of ordinary skill in the art would appreciate that other suitable key management protocols may be used.

The apparatus 100 includes a key store 120. The key store 120 is where the set of keys 112 and data associated with the roles 114 received from the group controller 116 are stored. The set of keys 112 may include keyed-Hash Message Authentication Code (HMAC) keys, cryptographic keys, and/ or symmetric keys. A person of ordinary skill in the art would appreciate that the keys referred to above are not an exhaustive listing of keys that may be used but rather are an exemplary list used for descriptive purposes. Key store 120 may be a data store. "Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

Apparatus 100 also includes a receive logic 130 for receiving the secure network traffic 132. The receive logic 130 drops the secure network traffic 132 upon a determination by the membership logic 110 that membership in the group key system was denied by the group controller 116. Dropping the secure network traffic includes not sending the secure network traffic to its destination and erasing the secure network traffic from memory.

Apparatus 100 also includes behavior logic 140. Behavior logic 140 selectively performs processing of the secure network traffic 132 received by the receive logic 130. Processing of the secure network traffic 132 by the behavior logic 140 may include inspecting, rewriting, and/or validating the secure network traffic 132 based upon the role(s) 114. The inspecting, rewriting, and/or validating may be performed using members of the set of keys 112. The behavior logic 140 selectively provides the processed secure network traffic 142. Recall that group controller 116 more generally provides policies, and a role 114 may be a type of policy. In one example, an security parameter index (SPI) minimum value may be a policy that originates from group controller 116 while in another example it may be a global policy value that is installed independently of the process of joining a particular group.

Assignment to the role of inspection point includes receiving a set of keys 112 that includes group decryption keys. Once assigned the role of inspection point, the apparatus 100 may inspect the secure network traffic 132 using the group decryption keys. Inspecting the secure network traffic 132 may include the behavior logic 140 decrypting the secure network traffic 132 in order to analyze the traffic by performing virus scanning, signature comparison, malware detection, denial of service detection, intrusion detection, and so on. While decrypting the traffic for security related applications are described, it is to be appreciated that traffic may be decrypted for other purposes including, for example, networking monitoring, troubleshooting, and so on. A person of ordinary skill in the art would appreciate that the methods of analyzing referred to above are not an exhaustive listing of methods, but rather are an exemplary list used for descriptive purposes.

Assignment to the role of validation point includes receiving a set of keys 112 that includes group authentication keys. Validation that the secure network traffic was generated by a trusted source may occur in at least two separate ways. In one example, validation may occur by verification of a security level associated with an SPI. The SPI denotes a level of security associated with a trusted provider. Where the SPI satisfies a minimum value the secure network traffic 132 is automatically sent to its destination without processing by the apparatus 100. Validation of a trusted source may also occur by authenticating a message authentication code. Similarly, verification that the secure network traffic 132 was unmodified in transit may occur by authenticating a message authentication code.

Assignment to the role of rewriting point includes receiving a set of keys 112 that includes group authentication keys and group decryption keys. Performing the role of rewriting point includes rewriting the secure network traffic 132 by using both group decryption keys and group authentication keys. Rewriting the secure network traffic may include performing authentication of the secure network traffic 132 using the authentication keys from the set of keys 112. Apparatus 100 decrypts the secure network traffic 132 using the group decryption keys from the set of keys 112. The apparatus 100 may then alter the decrypted secure network traffic by rewriting network address headers, compressing data, streamlining protocols, and so on. Apparatus 100 may re-encrypt the decrypted network traffic using the group decryption keys from the set of keys 112 and then re-authenticate the rewritten secure network traffic utilizing the group authentication keys. Re-authenticating the secure network traffic may include calculating a new message authentication code for the rewritten secure network traffic and appending the new message authentication code to the rewritten secure network traffic. Alternatively, re-authenticating may include changing an SPI. A person of ordinary skill in the art would appreciate that the rewriting described above is not an exhaustive listing of techniques, but rather is an exemplary list used for descriptive purposes.

The apparatus 100 may be, for example, a firewall, an intrusion detection system (IDS) device, a distributed denial of service (DDoS) mitigation system device, a wide area network (WAN) optimization device, a content caching device, a router, a network monitoring device (e.g., data analyzer) and so on. The router may utilize network address translation (NAT) and/or port address translation (PAT) to route secure network traffic to an appropriate destination on a local area network (LAN). A person of ordinary skill in the art would appreciate that implementation in the form of the recited devices is not intended to be limiting but is used for descriptive purposes.

The receive logic 130 may determine whether a packet of the secure network traffic 132 will be processed by the behavior logic 140. The determination may be based, for example, on an SPI that identifies a security association (SA). Generally, the SPI is envisioned as a sliding scale of trust where the apparatus 100 is provided a security level and if the SPI of the secure network traffic is above the specified security level for that apparatus then the secure network traffic is a candidate for automatically being sent to its destination without processing by the apparatus 100. However, the SPI may first be authenticated. For example, a message authentication code may be authenticated based on group authentication keys. In this case, verification that the secure network traffic 132 was unmodified in transit may include authenticating the message authentication code based on the keys 112.

A request for membership in the group key system by the membership logic 110 may depend, for example, on the identity of the requesting apparatus 100. Membership in the group provides information about the SA. An SA may identify the type of secure network traffic 132. The different types of traffic may include decryptable, undecryptable but authenticated, and undecryptable. Decryptable secure network traffic is traffic that may be inspected, validated, or rewritten as disclosed. Undecryptable but authenticated traffic is traffic that cannot be decrypted by the apparatus 100 and is considered trusted. Undecryptable but authenticated secure network traffic is sent to its destination without processing by the apparatus 100. Undecryptable secure network traffic is traffic that is encrypted and not trusted by the apparatus 100. Undecryptable traffic may be dropped by apparatus 100 without processing.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities. "Signal", as used herein, includes but is not limited to, electrical signals, optical signals, analog signals, digital signals, data, computer instructions, processor instructions, messages, a bit, a bit stream, or other means that can be received, transmitted and/or detected.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2:
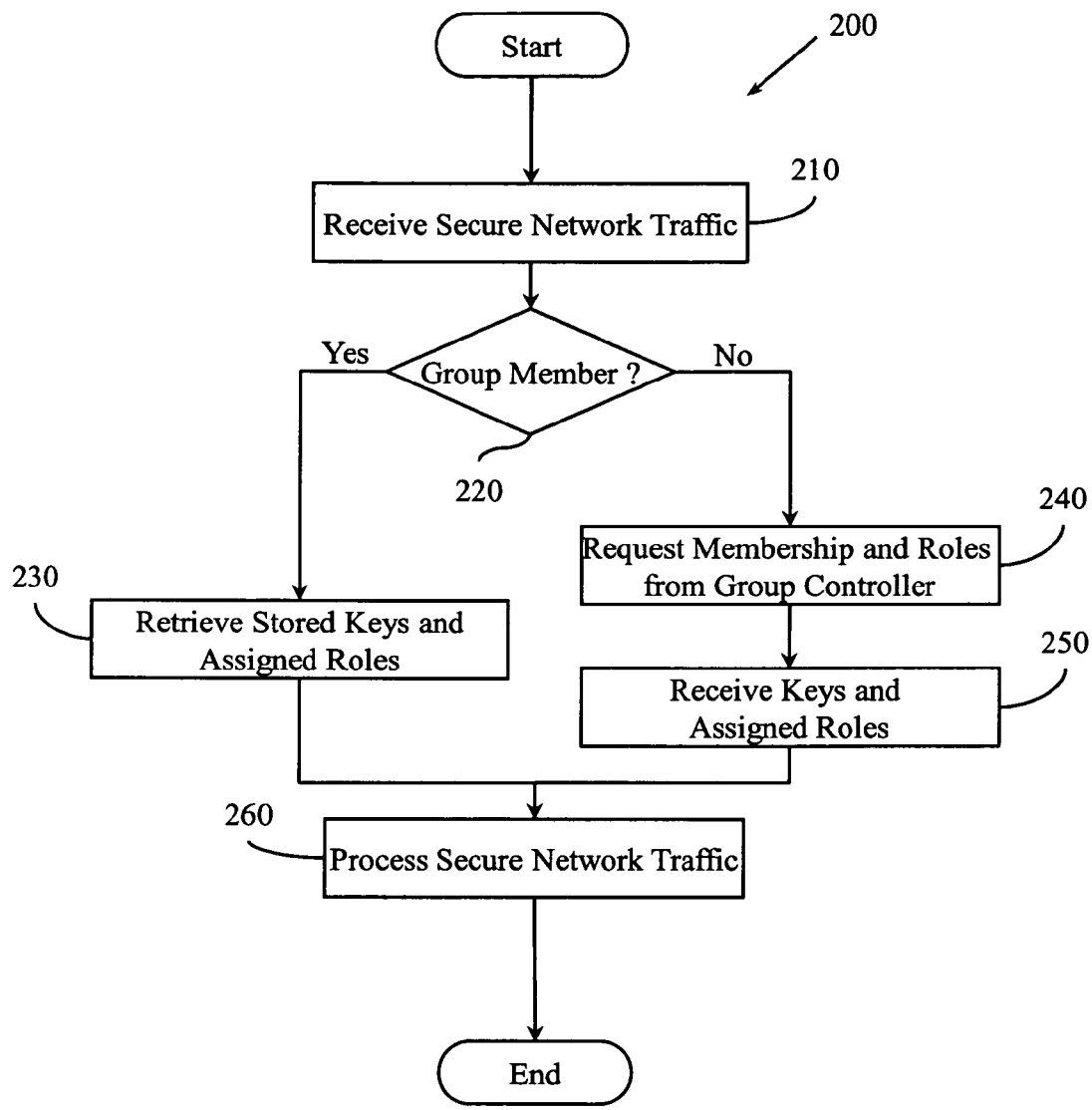
FIG. 2 illustrates an example method associated with selectively processing secure network traffic.

FIG. 2 illustrates a method 200 associated with selectively processing secure network traffic. The method 200 includes, at 210, receiving secure network traffic from a network device. Method 200 also includes, at 220, determining whether an apparatus is a member of a group key system from which the secure network traffic was received. If the determination at 220 is that the apparatus is a member of the group key system, then method 200 proceeds, at 230, to access a previously stored set of keys and previously assigned role(s).

If method 200 determines, at 220, that the apparatus is not a member of the appropriate group key system then method 200 requests, at 240, membership in the group key system from a group controller. A positive response for membership by the group controller includes receiving, at 250, a set of keys and assignment of a requested role(s). The assigned role(s) can be a rewriting point, an inspection point, and/or a validation point.

Method 200 includes, at 260, selectively processing the secure network traffic. Selectively processing the secure network traffic at 260 as an inspection point includes inspecting the secure network traffic using a set of keys that includes group decryption keys. Inspecting the secure network traffic is discussed in detail with the description of FIG. 4. Selectively processing the secure network traffic at 260 as a rewriting point includes rewriting the secure network traffic using a set of keys that includes group decryption keys and group authentication keys. Rewriting the secure network traffic is discussed in detail with the description of FIG. 3. Selectively processing the secure network traffic at 260 as a validation point may include validating the secure network traffic using a set of keys that includes group authentication keys. Validating the secure network traffic is discussed in detail with the description of FIG. 5.

While FIG. 2 illustrates various actions occurring in serial, it is to be appreciated that various actions illustrated in FIG. 2 could occur substantially in parallel. By way of illustration, a first process could receive secure network traffic, a second process could determine group membership, and a third process could selectively process secure network traffic. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 200. While executable instructions associated with the above method are described as being stored on a computer-readable medium, it is to be appreciated that executable instructions associated with other example methods described herein may also be stored on a computer-readable medium. "Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a compact disk (CD), other optical medium, a random access memory (RAM), a read only memory (ROM), a memory chip or card, a memory stick, and other media from which a computer, a processor or other electronic device can read.

Figure 3:
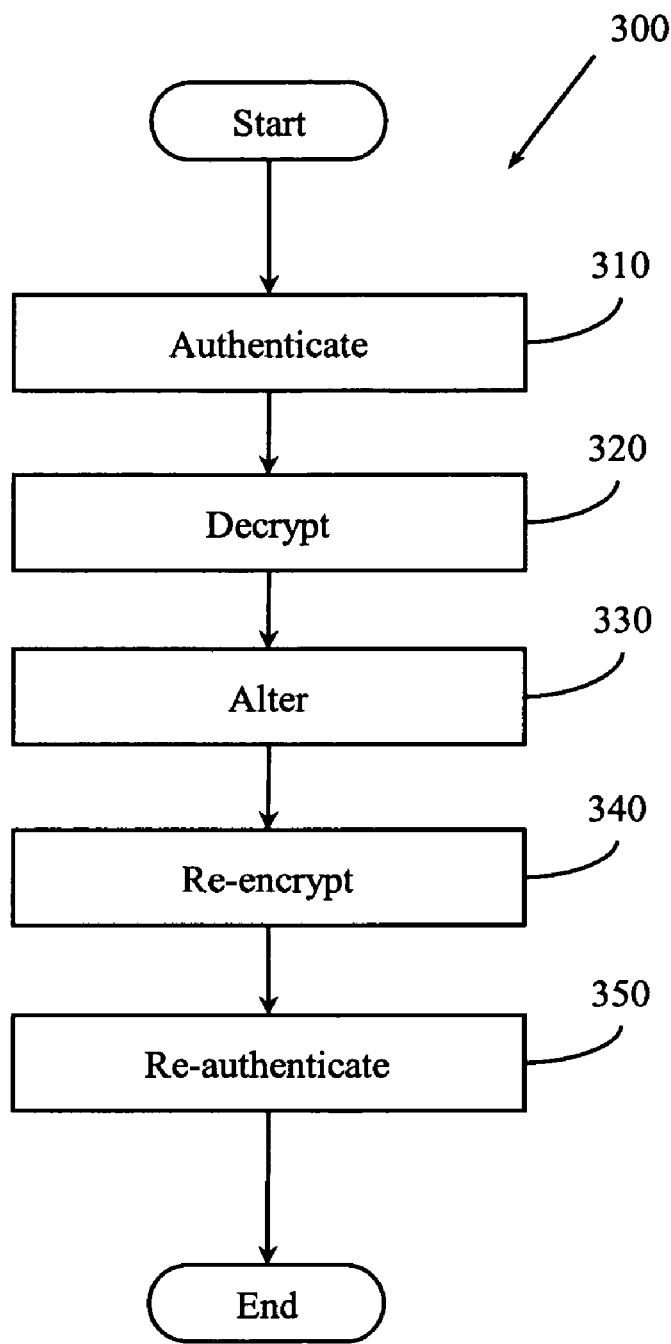
FIG. 3 illustrates another example method associated with rewriting secure network traffic.
Figure 5:
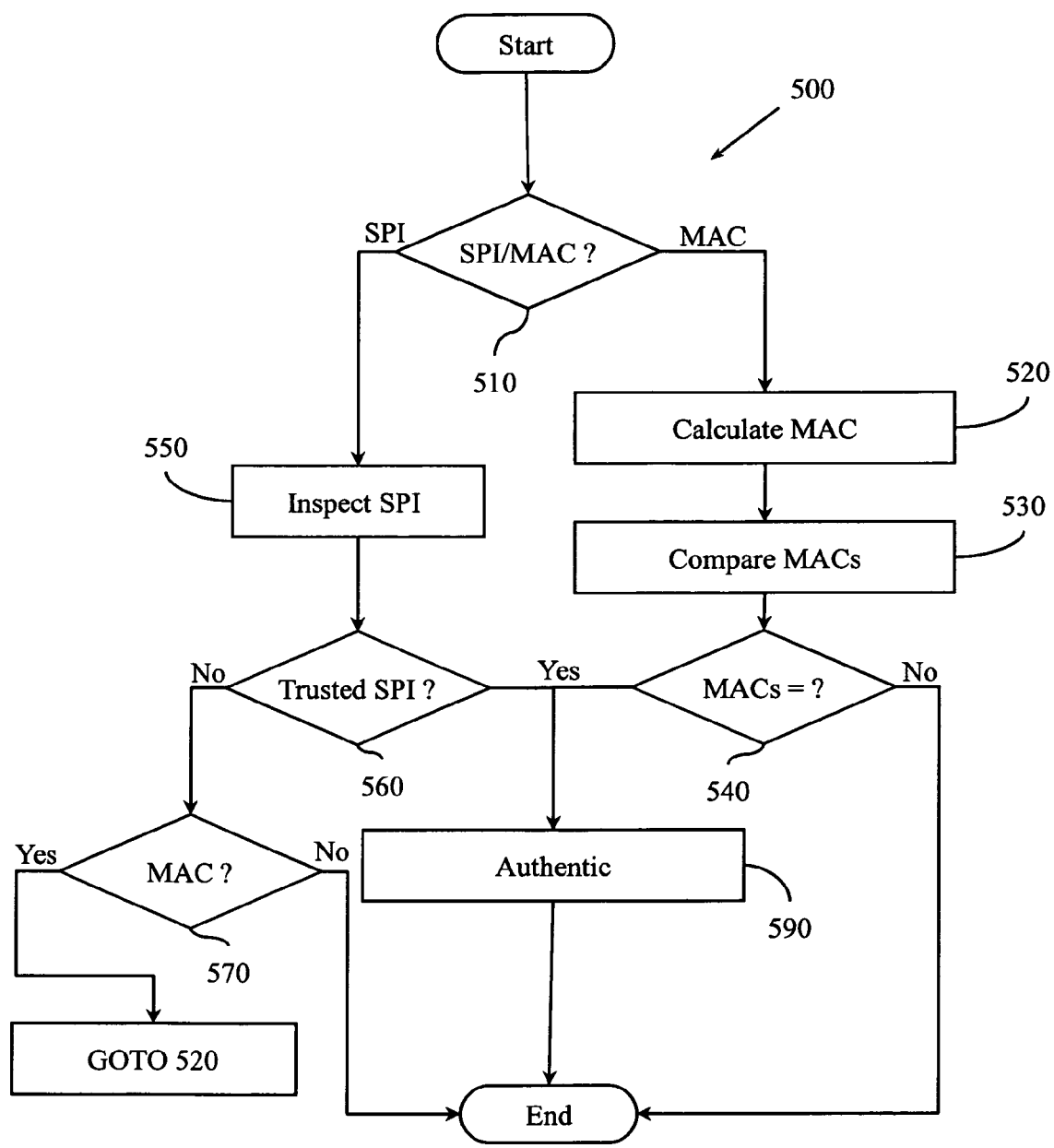
FIG. 5 illustrates another example method associated with validating secure network traffic.

FIG. 3 illustrates a method 300 associated with rewriting secure network traffic. The method 300 includes authenticating, at 310, the secure network traffic as discussed in relation to method 500 (FIG. 5). The secure network traffic is then decrypted, at 320, into decrypted network traffic. The decrypted network traffic is altered, at 330, by rewriting network address headers, compressing data, streamlining protocols, and so on. The decrypted network traffic is then re-encrypted, at 340, into rewritten secure network traffic using group decryption keys. The rewritten secure network traffic is re-authenticated, at 350, utilizing the group authentication keys. Re-authenticating the secure network traffic may include calculating a new message authentication code for the rewritten secure network traffic and appending the new message authentication code to the rewritten secure network traffic. Alternatively, re-authenticating may include changing an SPI.

Figure 4:
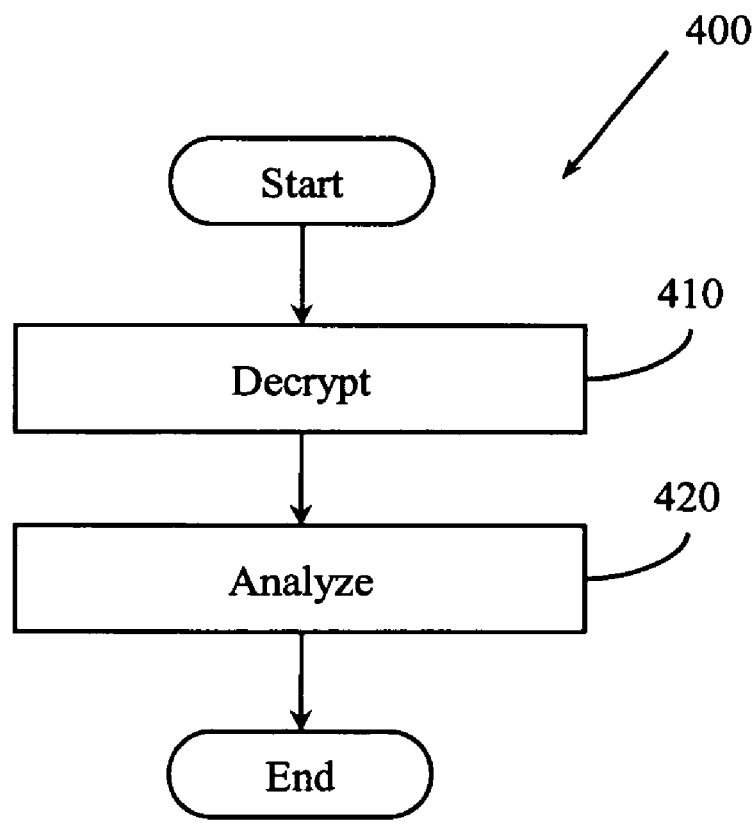
FIG. 4 illustrates another example method associated with inspecting secure network traffic.

FIG. 4 illustrates a method 400 associated with inspecting secure network traffic. The method 400 includes, at 410, decrypting the secure network traffic into decrypted network traffic based on the set of keys. Method 400 decrypts the secure network traffic at 410 by utilizing cryptographic keys to transform the secure network traffic into plaintext. Method 400 proceeds, at 420, to analyze the secure network traffic by performing virus scanning, signature comparison, malware detection, denial of service detection, intrusion detection, network monitoring, and so on, on the decrypted network traffic. Method 400 utilizes group decryption keys from the set of keys. Decrypting the secure network traffic provides access to the plaintext contents of the traffic. Access to the plaintext of the secure network traffic facilitates performing the analyzing functions. The analyzing functions process this plaintext in order to detect viruses, malware, and so on.

FIG. 5 illustrates a method 500 associated with validating secure network traffic. Method 500 includes, at 510, determining whether the secure network traffic includes an SPI or a message authentication code (MAC). If method 500 determines, at 510, that the secure network traffic contains an SPI then method 500 proceeds, at 550, to inspect the SPI. At 560, method 500 determines whether the SPI is associated with a trusted SA. If method 500 determines, at 560, that the SPI is associated with a trusted SA then method 500 proceeds to 590 where the secure network traffic is authenticated. If method 500 determines that the SPI is not associated with a trusted SA then the method proceeds to 570.

If at either 570 or 510 method 500 determines there is a message authentication code in the secure network traffic, method 500 proceeds to 520. At 520 the message authentication code of the secure network traffic is calculated using the group authentication keys from the set of keys. A person of ordinary skill in the art would appreciate that calculating a message authentication code may occur in different ways including regular message authentication codes, keyed-hash message authentication codes, and so on. A person of ordinary skill in the art would also appreciate that different algorithms may be used to perform message authentication code calculation including message-digest algorithm 5 (MD5), secure hash algorithm 1 (SHA-1), HAVAL, and so on. Additionally, a person of ordinary skill in the art would appreciate that different types of cryptographic keys may be utilized in calculating cryptographic hashes for message authentication codes including 128 bit keys, 256 bit keys, 512 bit keys, 1024 bit keys, symmetric keys, asymmetric keys, and so on. From 520 method 500 proceeds to 530 where the calculated message authentication code and the message authentication code from the secure network traffic are compared. If method 500 determines, at 540, that the calculated message authentication code and the message authentication code from the secure network traffic are equal then method 500 proceeds to 590 where the secure network traffic is authenticated. If method 500 determines, at 540, that the calculated message authentication code and the message authentication code from the secure network traffic are not equal then the method 500 ends and the secure network traffic is not authenticated.

Figure 6:
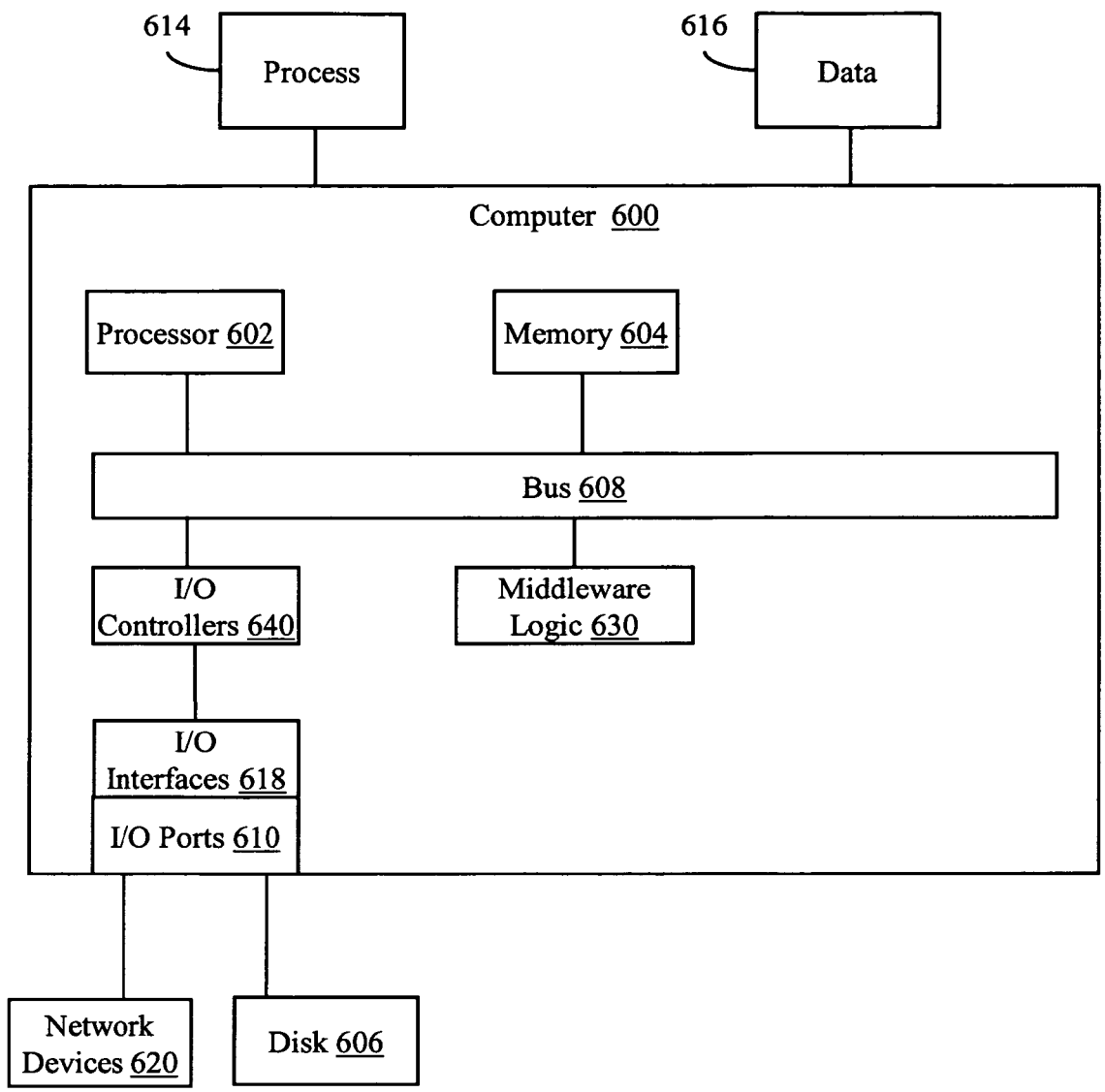
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a middleware logic 630 configured to facilitate processing of secure network traffic. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602. Thus, logic 630 may provide means (e.g., hardware, software, firmware) for processing secure network traffic. The means may be implemented, for example, as an ASIC programmed to process secure network traffic. The means may also be implemented as computer executable instructions that are presented to computer 600 as data 616 that are temporarily stored in memory 604 and then executed by processor 602. "Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Logic 630 may also provide means (e.g., hardware, software, firmware) for determining whether a device that receives secure network traffic is a preconfigured member of a group key system. The means determines whether a device is a preconfigured member by determining if the necessary set of keys and data defining the role(s) are stored in a data store. Logic 630 may also provide means for selectively requesting membership in the group key system from a group controller. Logic 630 may also include means for selectively processing the secure network traffic as an inspection point, a rewriting point, or a validation point as controlled by the roles and in light of the set of keys. A group controller provides the roles and keys to the logic 630.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM, programmable ROM (PROM), and so on. Volatile memory may include, for example, RAM, synchronous RAM (SRAM), dynamic RAM (DRAM), and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-recordable (CD-R) drive, a CD-rewritable (CD-RW) drive, a digital versatile disk (DVD) ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., peripheral component interconnect express (PCIE), 1394, universal serial bus (USB), Ethernet). The bus 608 can be types including, for example, a memory bus, a memory controller, a peripheral bus, an external bus, a crossbar switch, and/or a local bus.

The computer 600 may interact with input/output devices via the input/output (i/o) interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Gamer, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. An apparatus, comprising:
   a membership logic to control membership in a group key system, where establishing membership in the group key system includes receiving a set of keys from a group controller and being assigned one or more roles by the group controller;
   a key store to store the set of keys;
   a receive logic to receive secure network traffic; and
   a behavior logic to selectively perform one or more of, inspection of the secure network traffic, rewriting of the secure network traffic, and validation of the secure network traffic, and to selectively provide processed secure network traffic based, at least in part, on the set of keys and the one or more roles.

2. The apparatus of claim 1, where the membership logic requests membership into the group key system from the group controller, and where the membership logic requests one or more roles from the group controller.

3. The apparatus of claim 2, where the receive logic drops the secure network traffic upon a determination by the membership logic that membership in the group key system was denied by the group controller.

4. The apparatus of claim 1, where the set of keys includes group decryption keys, where the apparatus is assigned the role of an inspection point by the group controller, and where performing the role of inspection point includes performing inspection of the secure network traffic using the group decryption keys.

5. The apparatus of claim 4, where inspection of the secure network traffic includes decrypting the secure network traffic into decrypted network traffic based on the group decryption keys, and analyzing the decrypted network traffic.

6. The apparatus of claim 5, where analyzing the decrypted network traffic includes performing one or more of, virus scanning, signature comparison, malware detection, denial of service detection, intrusion detection, and network monitoring.

7. The apparatus of claim 1,
   where the set of keys includes group authentication keys, where the apparatus is assigned the role of a validation point by the group controller, and where performing the role of validation point includes performing validation of the secure network traffic by using the group authentication keys; and,
   where validation of the secure network traffic includes performing one or more of, verification that the secure network traffic was generated by a trusted source, and verification that the secure network traffic was unmodified in transit.

8. The apparatus of claim 7,
   where verification that the secure network traffic was generated by a trusted source includes one or more of, determining a security level of a security parameter index (SPI), and authenticating a message authentication code based at least in part on the group authentication keys; and
   where verification that the secure network traffic was unmodified in transit includes authenticating a message authentication code based at least in part on the group authentication keys.

9. The apparatus of claim 1, where the set of keys includes both group authentication keys and group decryption keys, where the apparatus is assigned the role of a rewriting point by the group controller, where performing the role of rewriting point includes rewriting the secure network traffic by using both group decryption keys and group authentication keys, and where rewriting the secure network traffic includes authenticating the secure network traffic based on the set of keys, decrypting .the secure network traffic into decrypted network traffic based on the set of keys, altering the decrypted network traffic, re-encrypting the decrypted network traffic into rewritten secure network traffic based on the set of keys, and re-authenticating the rewritten secure network traffic based on the set of keys.

10. The apparatus of claim 9, where altering the decrypted network traffic includes one or more of, rewriting network address headers, compressing data, and streamlining protocols.

11. The apparatus of claim 1, where the apparatus is a router, and where the router utilizes one or more of, network address translation (NAT), and port address translation (PAT).

12. The apparatus of claim 1, where the set of keys include one or more of, keyed-Hash Message Authentication Code (HMAC) keys, cryptographic keys, and symmetric keys.

13. The apparatus of claim 1, where the apparatus is one of, a firewall, an intrusion detection system (IDS) device, a distributed denial of service (DDoS) mitigation system device, a wide area network (WAN) optimization device, a content caching device, a router, and a network monitoring device.

14. The apparatus of claim 1, where the group key system is part of a group virtual private network (VPN); where the group VPN uses the internet protocol security (IPSEC) protocol; where the group controller is a key server; and where the group key system utilizes one or more of, the group secure association key management protocol (GSAKMP). and the group domain of interpretation (GDOI) protocol.

15. The apparatus of claim 1, where the receive logic determines if a packet of the secure network traffic will be processed by the behavior logic based, at least in part, on a security parameter index (SPI) that identifies a security association (SA).

16. The apparatus of claim 1, where a security association (SA) identifies the secure network traffic as one of, decryptable, undecryptable but authenticated, and undecryptable, where the membership logic receives a determination of membership to the group key system from the group controller based, at least in part, on the SA, and where the group controller determines if a request for membership to the group key system is admissible based, at least in part, on the identity of the apparatus.

17. Logic encoded in one or more non-transitory tangible media for execution and when execution operable to:
receive secure network traffic in a device;
upon determining that the device is a preconfigured member of a group key system, access a previously stored set of keys and a previously assigned role;
upon determining that the device is not a member of the group key system, request membership in the group key system from a group controller and requesting a role from the group controller, where establishing membership in the group key system includes receiving a set of keys from the group controller and being assigned a role by the group controller, the role being one of a rewriting point, an inspection point, and a validation point; and
selectively process the secure network traffic as one or more of, an inspection point, a rewriting point, and a validation point as controlled by the roles.

18. The non-transitory media of claim 17, where selectively processing the secure network traffic as an inspection point includes inspecting the secure network traffic using the set of keys,
where selectively processing the secure network traffic as a rewriting point includes rewriting the secure network traffic using the set of keys, and where selectively processing the secure network traffic as a validation point includes validating the secure network traffic using the set of keys.

19. The non-transitory media of claim 18, where inspecting the secure network traffic includes decrypting the secure network traffic into decrypted network traffic based on the set of keys and performing one or more of, virus scanning, signature comparison, malware detection, denial of service detection, intrusion detection, and network monitoring on the decrypted network traffic, and where the set of keys includes group decryption keys;
where validating the secure network traffic includes performing one or more of, authenticating a message authentication code based at least in part, on the set of keys, and determining a security level of a security parameter index (SPI). and where the set of keys includes group authentication keys; and
where rewriting the secure network traffic includes authenticating the secure network traffic based on the set of keys, decrypting the secure network traffic into decrypted network traffic based on the set of keys, altering the decrypted network traffic, re-encrypting the decrypted network traffic into rewritten secure network traffic based on the set of keys, and re-authenticating the rewritten secure network traffic based on the set of keys, where altering the secure network traffic includes, rewriting network address headers, compressing data, and streamlining protocols, and where the set of keys includes both group authentication keys and group decryption keys.

20. A system, comprising:
means for determining whether a device that receives secure network traffic is a preconfigured member of a group key system; means for selectively requesting membership in the group key system from a group controller; and
means for selectively processing the secure network traffic as one or more of, an inspection point, a rewriting point, and a validation point as controlled by one or more roles and in light of one or more keys, where the roles and the keys are provided by the group controller.

\* \* \* \* \*